United States Patent [19]

Cisneros

[11] Patent Number: 5,308,553
[45] Date of Patent: May 3, 1994

[54] METAL HYDRIDE COMPOSITIONS AND METHODS

[75] Inventor: Ignacio L. Cisneros, Odessa, Tex.

[73] Assignee: Swan Industries, Inc., Odessa, Tex.

[21] Appl. No.: 744,714

[22] Filed: Aug. 14, 1991

[51] Int. Cl.$^5$ .......................... C09K 21/00; B27N 9/00
[52] U.S. Cl. .................... 252/601; 252/602; 252/607; 252/2; 428/920; 423/347; 106/18.12; 106/18.26
[58] Field of Search ............... 252/601, 602, 606, 607, 252/2; 423/99, 111, 324, 347; 106/18.11, 18.12, 18.26

[56] References Cited

U.S. PATENT DOCUMENTS

| | | | |
|---|---|---|---|
| 4,570,713 | 2/1986 | Rice | 166/275 |
| 4,571,328 | 2/1986 | Rice | 106/1.27 |
| 4,585,579 | 4/1986 | Bommaraju et al. | 252/387 |
| 4,664,712 | 5/1987 | Cisneros | 106/84 |
| 5,035,951 | 7/1991 | Dimanshteyn | 428/446 |
| 5,049,316 | 9/1991 | Kokuta et al. | 252/602 |

*Primary Examiner*—Richard D. Lovering
*Assistant Examiner*—Joseph D. Anthony
*Attorney, Agent, or Firm*—Laubscher & Laubscher

[57] ABSTRACT

Metal hydride compositions comprise a mixture of (a) from about 1 to about 10 parts, by molecular weight, of at least one metal selected from the group consisting of silicon, aluminum, tin and zinc; (b) from about 1 to about 3 parts, by molecular weight, of an alkali metal hydroxide; and (c) from about 5 to about 10 parts, by molecular weight, of water. These compositions may be used in various applications, including, among others, methods for separating coal fines from coal fine waste slurries, methods for cleaning and desludging hydrocarbon storage tanks, methods for providing fire-retardant properties to composite materials and methods for providing corrosion protection to metal parts.

6 Claims, No Drawings

METAL HYDRIDE COMPOSITIONS AND METHODS

FIELD OF THE INVENTION

The present invention relates to metal hydride compositions, and more particularly to metal hydride compositions prepared from at least one metal selected from the group of silicon, aluminum, tin and zinc. The present invention also relates to various methods which employ the metal hydride compositions.

BACKGROUND OF THE INVENTION

The Cisneros U.S. Pat. No. 4,664,712 discloses thermal insulating materials formed by the curing and drying of a composition comprising an expanded siliceous inorganic aggregate, aqueous sodium silicate, kaolin, mica, inorganic reinforcing fiber and a filler. Other thermal insulating materials and compositions are also known in the art. It is often desirable that such materials exhibit fire-retardant properties, whereby a fire-retardant additive is required.

SUMMARY OF THE INVENTION

Accordingly, it is an object of the present invention to provide compositions which may be used as fire retardant additives in insulating and other composite materials. It is a further object of the invention to provide compositions which may be employed in a variety of different methods. It is a further object of the invention to provide compositions which are nontoxic and biodegradable.

These and additional objects are provided by the metal hydride compositions according to the present invention which comprise a mixture of from about 1 to about 10 parts, by molecular weight, of at least one metal selected from the group consisting of silicon, aluminum, tin and zinc, from about 1 to about 3 parts, by molecular weight, of an alkali metal hydroxide, and from about 5 to about 10 parts, by molecular weight, of water. These compositions are prepared by adding alkali metal hydroxide to the at least one metal, followed by addition of the water thereto. It is preferred that the mixtures are allowed to stand for a period of from to about 6 to 8 hours before use. As will be set forth in detail below, the metal hydride compositions are suitable for use in numerous methods and applications.

These and additional objects and advantages of the compositions and methods of the present invention will be more fully apparent in view of the following detailed description.

DETAILED DESCRIPTION

The metal hydride compositions of the present invention comprise a mixture of from about 1 to about 10 parts, by molecular weight, of at least one metal selected from the group consisting of silicon, aluminum, tin and zinc, from about 1 to about 3 parts, by molecular weight, of an alkali metal hydroxide, and from about 5 to about 10 parts, by molecular weight, of water. Silicon is a preferred metal for use in the present compositions. The compositions may be formed by adding the alkali metal hydroxide to the at least one metal, followed by addition of the water. The alkali metal hydroxide may be added in solid or liquid solution form. Preferably, the alkali metal hydroxide is selected from sodium hydroxide and potassium hydroxide. The mixture may be prepared in any suitable reactor, for example, a glass lined reactor or a stainless steel vessel or the like. It is preferred that the mixture is allowed to stand for a period of at least from about 6 to about 8 hours in order to allow reaction of the components, resulting in the formation of a metal hydride. The amount of water employed in the composition may be varied in order to vary the density of the composition.

Examples of various specific compositions according to the present invention, include, but are not limited to, the following Formulas Nos. 1–6:

| Component | Parts, Molecular Weight |
| --- | --- |
| FORMULA No.1 | |
| Si (Silicon Metal) | 6 |
| NaOH (Sodium Hydroxide) | 1 |
| H$_2$O (Water) | 10 |
| FORMULA No. 2 | |
| Si (Silicon Metal) | 6 |
| KOH (Potassium Hydroxide) | 1 |
| H$_2$O (Water) | 10 |
| FORMULA No. 3 | |
| Al (Aluminum) | 2 |
| NaOH (Sodium Hydroxide) | 1 |
| H$_2$O (Water) | 8 |
| FORMULA No. 4 | |
| Sn (Tin) | 5 |
| NaOH (Sodium Hydroxide) | 1 |
| H$_2$O (Water) | 10 |
| FORMULA No. 5 | |
| Zn (Zinc) | 1 |
| NaOH (Sodium Hydroxide) | 1 |
| H$_2$O (Water) | 6 |
| FORMULA No. 6 | |
| Si (Silicon Metal) | 1 |
| NaOH (Sodium Hydroxide) | 7 |
| H$_2$O (Water) | 10 |

With respect to Formula No. 6 set forth above, it is preferred that the mixture is also heated at approximately 100° C. for from about 12 to about 20 hours to allow reaction of the mixture components.

The compositions according to the present invention may be combined with one or more additional components depending on the desired dose of the compositions. For example, as will be set forth in greater detail below, the compositions may be combined with one or more inorganic clays, such as kaolin and/or bentonite, and/or filler materials such as expanded perlite, wood fibers, rice hull ashes, and the like.

The metal hydride compositions according to the present invention may be employed in a variety of methods. For example, the compositions may be employed in the reclamation of coal slurry ponds. As is well known in the art, coal is often subjected to a cleaning process before it is employed in energy-generating plants. The cleaning processes employ washing and separating steps which separate the usable coal for further processing. A waste slurry is produced from these cleaning processes and contains coal fines, sand fines, clay fines and other debris. In the past, these waste slurries have been deposited in coal slurry ponds.

However, the metal hydride compositions of the present invention may be employed to separate the coal fines from the waste slurry, thereby producing further usable coal materials at a very low cost. The metal hydride compositions of the present invention act as a surfactant in the separation processes. A suitable wetted water to coal slurry weight ratio is approximately 3:1 with a weight ratio of surfactant composition to water of about 100:1. These methods result in the production of a clean coal slurry and waste materials. Table I sets forth the analysis of solid materials in (A) an untreated waste slurry sample and (B) a clean coal slurry sample resulting from a method employing the metal hydride composition of the present invention:

TABLE I

|  | A. Untreated Sample Dry Basis | B. Treated Sample Dry Basis |
| --- | --- | --- |
| % Moisture | N/A | N/A |
| % Ash | 39.59 | 3.83 |
| % Volatile | 25.73 | 36.13 |
| % Fixed Carbon | 34.68 | 60.04 |
|  | 100.00% | 100.00% |
| Btu/lb. | 8687 | 14397 |
| % Sulfur | 2.55 | 0.93 |

The data set forth in Table I demonstrates that the method for separating coal fines from a waste slurry employing the metal hydride compositions of the present invention provides a clean coal slurry product having reduced ash, increased volatiles, carbon and BTU value, and a reduction in sulfur. Thus, the compositions of the present invention may be used to provide a good coal product at low cost.

In another embodiment, the compositions according to the present invention may be used to clean and desludge hydrocarbon storage tanks. In the past, the cleaning of hydrocarbon storage tanks has been a laborious, time-consuming dangerous process. However, the compositions according to the present invention provide a safe and nontoxic method for cleaning and desludging hydrocarbon storage tanks. The compositions according to the present invention reduce the surface tension between heavy solids and crude hydrocarbons, vastly improving the shear quality of the crude, as well as improving the mobility of hydrocarbons contained in the sludge solids. Additionally, the compositions of the invention do not mix with hydrocarbons. Thus, when sludge is emulsified with the compositions of the present invention and then allowed to settle, the usable hydrocarbons rise to the top of the mixture while clays, sand and other solids fall to the bottom, with the formation of a middle layer comprising a reclaimable metal hydride solution. In cleaning and desludging hydrocarbon storage tanks, it is preferred that the compositions of the present invention are heated, for example, by injection of steam therein, and then sprayed into the storage tank. Once the metal hydride composition and the sludge are fully emulsified, the tank contents are allowed to stand whereby formation of the lower sludge-containing layer, the intermediate metal hydride cleaning composition-containing layer and the upper hydrocarbon-containing layer result. The respective layers may then be separated. During the cleaning process, the compositions of the present invention may be stirred and/or recirculated within the storage tank to provide improved contact with the tank surface area. The compositions according to the present invention are particularly advantageous for use in cleaning and desludging hydrocarbon storage tanks owing to their nontoxic, noncombustible properties and their complete water solubility.

The compositions of the present invention are suitable for use in other methods involving hydrocarbon materials. For example, the compositions may be employed to recover oil from bitumen and tar sands, to improve oil and gas production and to clean benzene storage tanks in an enclosed, non-polluting system. The compositions may also be used for base oil reclamation for lubricant processes and refineries, to recycle and recover used motor oil, in steam and water floods in secondary oil and gas recovery and/or as a carrier for other chemicals in paraffin treatment in oil and gas wells.

The compositions according to the present invention may also be used to provide fire-retardant properties to various composite materials by including therein a fire-retarding amount of the present metal hydride compositions. For example, a fire-retardant particle board can be prepared from the following composition Formula No. 7:

| FORMULA No. 7 |
| --- |
| 128.4 grams of Wood Fibers |
| 117.7 grams of Metal Hydride Composition |
| 1.0 gram Phosphoric Acid |
| 180.0 grams Water |
| 170.4 grams Expanded Perlite Fines |

The fire-retardant board is prepared by mixing the above ingredients, pressing the mixture in a mold and heating the mold at a high temperature, for example, 150° C., for about 6 to about 8 hours. The fire-retardant insulation material may be formed from the following composition Formula No. 8:

| FORMULA No. 8 |
| --- |
| 2,400 liters Expanded Perlite |
| 300 grams of Metal Hydride Composition |
| 2.5 grams Silicone Oil |
| 60.0 grams Kaolin |
| 50.0 grams Water |

In preparing the fire-retardant insulation, the above components are mixed, molded and heated at a temperature of, for example, 425° C. A high density fire-retardant panel may be prepared from the metal hydride compositions of the present invention using the following composition Formula No. 9:

| FORMULA No. 9 |
| --- |
| 414.0 grams of Mineral Fibers |
| 4.68 liters Expanded Perlite |
| 144.0 grams Rice Hull Ashes |
| 396.0 grams Metal Hydride Composition |
| 1.8 grams Phosphoric Acid |
| 72.0 grams Kaolin |
| 180.0 grams Water |
| 4.5 grams Silicone Oil |

To form the fire-retardant panel, the above components are mixed, molded and heated at, for example, 425° C.

The metal hydride compositions of the invention may similarly be employed as a fire-retardant material for wood, paper and fabric articles, and other composite materials. The metal hydride compositions of the invention may also be used as a liquid fire suppressant. The metal hydride compositions have also been used in making a fire retardant adhesive by a combination of the metal hydride compositions with kaolin and/or one or more other clays such as bentonite. A particularly suitable high temperature adhesive may be prepared using a ratio of 1.5 pounds kaolin mixed with 1 gallon of the metal hydride composition.

The metal hydride compositions of the invention may also be employed in other cleaning methods, for example, steam cleaning of various equipment, as a window cleaning fluid, as an additive for carpet cleaning and the like.

In a further embodiment, the metal hydride compositions of the present invention may be employed in coatings for metal and concrete parts. The metal hydride compositions may be employed in corrosion-preventing amounts in order to protect steel and other metals and/or concrete from corrosion. The compositions may be employed as a metal plating agent to protect metals from corrosion and to harden metals. These compositions may also be employed to coat metal fittings to render them galling free. The compositions of the present invention may also be employed as antistick coatings for metal tanks and other metal vessels.

The metal hydride compositions of the invention may also be employed for separating heavy metals from a mining waste stream. The compositions are added to the mining waste stream in an amount sufficient to separate heavy metals from the mining waste stream. Such methods employing the compositions of the invention may be used in mining waste streams containing one or more of a variety of heavy metals, for example, aluminum, lead, cobalt, chromium, iron, nickel and the like.

The compositions according to the present invention may also be used in a number of additional methods and applications. For example, the compositions of the invention may be used by fire departments as a penetrating additive in spray applications for suppressing fires. The compositions of the invention may also be used in fertilizer compositions, as catalysts for nonphosphate soaps, as carriers for oxidants and in manufacturing precious stones. The metal hydride compositions may be further employed a replacement for hydraulic fluids, as additives for water-based paints, as a scrubber or scavenger additive for exhaust and plant stack emissions and in preparing super thin film metal depositions, for example, in electron voltaic cells and metal coatings.

The preceding detailed description is set forth to illustrate specific embodiments of the invention and is not intended to limit the scope of the compositions and methods of the present invention. Additional embodiments and advantage within the scope of the claimed invention will be apparent to one of ordinary skill in the art.

What is claimed is:

1. A composition consisting essentially of a mixture of (a) a fire-retarding amount of a mixture of (i) from about 1 to about 10 parts, by molecular weight, of at least one metal selected from the group consisting of silicon, aluminum, tin and zinc, (ii) from about 1 to about 3 parts, by molecular weight, of an alkali metal hydroxide, and (iii) from about 5 to about 10 parts, by molecular weight, of water, all three said components (i)–(iii) being allowed to stand for a time sufficient to react to form a metal hydride, and subsequently adding (b) expanded perlite as filler and (c) at least one additional filler said perlite and said additional filler being present in an amount sufficient to provide a composition moldable to article form.

2. A composition as defined by claim 1, wherein the additional filler comprises a clay.

3. A composition as defined by claim 2, wherein the clay is selected from the group consisting of kaolin and bentonite.

4. A composition as defined by claim 1, wherein the additional filler comprises wood fibers.

5. A composition as defined by claim 1, wherein the additional filler comprises mineral fibers.

6. A composition as defined by claim 1, wherein the additional filler comprises a mixture of mineral fibers, rice hull ashes and kaolin.

* * * * *